United States Patent [19]

Iwamoto et al.

[11] 4,388,447

[45] Jun. 14, 1983

[54] PROCESS FOR PRODUCING RUBBER MODIFIED STYRENE RESINS

[75] Inventors: Mune Iwamoto; Norifumi Ito; Yuzuru Ishida, all of Yokohama; Yasuo Furuta, Hiratsuka; Tetsuyuki Matsubara, Yokohama, all of Japan

[73] Assignee: Mitsui Toatsu Chemicals, Inc., Tokyo, Japan

[21] Appl. No.: 323,064

[22] Filed: Nov. 19, 1981

[30] Foreign Application Priority Data

Dec. 5, 1980 [JP] Japan ............................. 55/170889

[51] Int. Cl.³ ........................................... C08F 279/02
[52] U.S. Cl. ..................................... 525/316; 526/88
[58] Field of Search ..................... 525/53, 243, 316; 526/88

[56] References Cited

U.S. PATENT DOCUMENTS 3,438,952  4/1969  Christensen ........................ 526/88
3,706,719  12/1972 Goffinet .............................. 526/88
4,277,585  7/1981  Fournel .............................. 526/88
4,282,334  8/1981  Walter ............................... 525/243

*Primary Examiner*—Paul R. Michl
*Attorney, Agent, or Firm*—Fisher, Christen & Sabol

[57] ABSTRACT

Disclosed is a process for continuously producing rubber modified styrene resins wherein the rubbery phase including a rubber-like polymer is transformed into dispersed particles by using a reactor having both a helical-blade agitator mounted in a draft tube and an auxiliary agitator, by establishing a specified agitating force and a specified degree of circulation of the fluid within the reactor, and by maintaining a specified relation between the weight percentages, based on the total amount of all components within the reactor, of the rubber-like polymer and the monomer converted to polymer. According to this process, various grades of high-impact rubber modified styrene resins having excellent surface properties can be obtained without any adhesion of rubber-like matter to the reactor and without any formation of fisheyes in final products.

9 Claims, 1 Drawing Figure

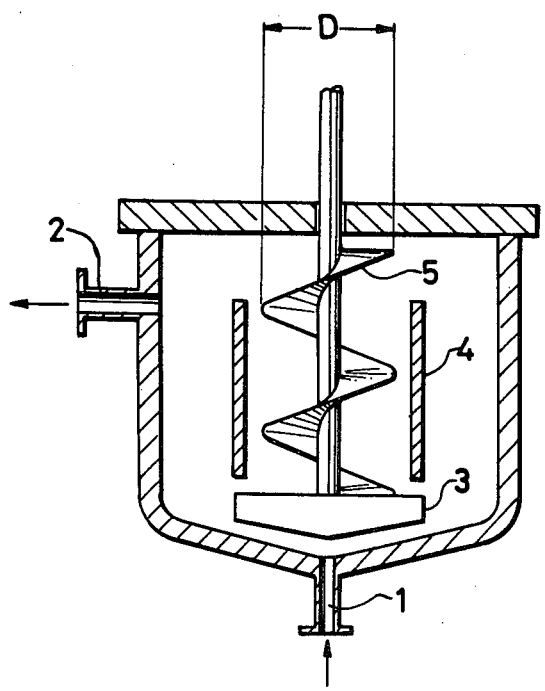
F I G. 1

PROCESS FOR PRODUCING RUBBER MODIFIED STYRENE RESINS

BACKGROUND OF THE INVENTION

1. Field of the Invention

This invention relates to a process for continuously producing high-impact rubber modified styrene resins according to solution or bulk polymerization techniques. More particularly, it relates to improvements in the method of transforming a rubber-like polymer into dispersed particles.

2. Description of the Prior Art

Conventionally, it is a widespread practice to continuously produce rubber modified styrene resins in which a rubber-like polymer is dispersed in the form of finely divided particles having an average diameter of 0.1 to 10 microns. Since the size of the rubber-like polymer particles present in the product exerts a great influence on its performance characteristics such as impact strength, gloss and the like, the control of particle diameter occupies a very important position among the techniques involved in the production of rubber modified styrene resins.

In recent years, however, there are growing market demands for high-performance products responding to the extending range of use of rubber modified styrene resins and for cost reduction by the adoption of more efficient production processes. In order to meet these demands, it is necessary to solve the following problems concerning the transformation of a rubber-like polymer into dispersed particles in the continuous production of rubber modified styrene resins.

(1) It must be feasible in a single production system to selectively produce various grades of rubber modified styrene resins which differ in average particle diameter, rubber content and/or the type of rubber so as to meet the market demands for varying combinations of performance characteristics such as impact properties, surface gloss of molded articles, and the like.

(2) In order to improve the impact properties of rubber modified styrene resins and the gloss and other surface properties of molded articles, the formation of giant particles (observed as fisheyes) during the dispersing operation, which will be fully described later, must be prevented.

(3) In order to avoid cleaning operation of the reactor, the adhesion of rubber-like matter to the inner walls of the reactor during the dispersing operation must be prevented.

(4) In order to meet the demand for better impact properties of rubber modified styrene resins or compensate the impaired impact properties thereof due to the incorporation of a flame retardant and the like, it is required to produce rubber modified styrene resins containing a high concentration (e.g., not less than 10% by weight) of rubber. Accordingly, even when a feed material having a high rubber content (e.g., a feed material composed of 9–20% by weight of rubber and 91–80% by weight of styrene) is subjected to polymerization, it must be possible to transform the rubber-like polymer into dispersed particles.

Generally, the shape and size of the rubber-like polymer particles dispersed in a rubber modified styrene resin are controlled by the conditions under which the rubbery phase including a rubber-like polymer is changed from a continuous phase into a discontinuous one, that is, the conditions of the process of transforming the rubbery phase into dispersed particles (which process will hereinafter be referred to as the dispersing operation). In the continuous production of rubber modified styrene resins, this dispersing operation is carried out in parallel with the transferring and polymerizing operations of the reaction mixture, so that greater difficulties are encountered than in the continuous production of ordinary styrene resins or the batch production of rubber modified styrene resins. In order to overcome these difficulties, a number of processes requiring complicated procedures have heretofore been proposed.

One exemplary process is disclosed in U.S. Pat. No. 3,660,535. This process is characterized in that a portion of the reaction mixture is withdrawn from the tubular reactor and returned to a section thereof preceding the site of phase transformation. Japanese Patent Publication No. 29793/'77 has proposed another process which involves preliminary polymerization (referred to as pregrafting) prior to the dispersing operation. However, these processes do not offer a satisfactory solution of the above-described problems inherent in this field of art.

SUMMARY OF THE INVENTION

It is an object of the present invention to provide a process for producing rubber modified styrene resins in which a single production system can be used to selectively produce various grades of high-impact rubber modified styrene resins having performance characteristics responsive to the demands of the market.

It is another object of the present invention to provide such a process in which the surface properties of molded articles can be improved by eliminating the formation of fisheyes in the step of dispersing the rubber-like polymer.

It is still another object of the present invention to provide such a process in which the adhesion of rubber-like matter to the walls of the reactor can be prevented and a feed material containing a high concentration of rubber can be used.

The above objects of the present invention are accomplished by providing a process for continuously producing rubber modified styrene resins from a rubber-like polymer and a styrene monomer according to solution or bulk polymerization techniques, which comprises:

(A) transforming the rubbery phase including said rubber-like polymer into dispersed particles in a stirred-tank reactor having both a helical-blade agitator mounted in a draft tube and an auxiliary agitator for causing the stream of fluid having just entered said reactor to diverge and flow in various directions;

(B) controlling the agitating efficiency of said agitators in such a way that the average number of circulations of the fluid within said reactor is not less than 20 per hour;

(C) operating said helical-blade agitator in such a way that the value of $N^2 \cdot D$ satisfies $$20 > N^2 \cdot D > 0.15$$

where N is the rotational speed, in rps, of said helical-blade agitator and D is the diameter, in meters, of said helical-blade agitator; and (D) determining the operating conditions in such a way that the values of $X_1$ and $X_2$ satisfy $$20 \geq X_1$$

and $$50 \geq X_2 \geq 2.4X_1 - 0.05X_1^2$$

where $X_1$ is the weight percentage of said rubber-like polymer and $X_2$ is the weight percentage of the polymerizable monomer converted to polymer, said weight percentages being based on the total amount of all components within said reactor.

BRIEF DESCRIPTION OF THE DRAWING

The sole FIGURE is a schematic view of a stirred-tank reactor suitable for carrying out the process of the present invention.

DETAILED DESCRIPTION OF THE INVENTION

The requisite A of the present invention dictates the use of a stirred-tank reactor having both a helical-blade agitator mounted in a draft tube and an auxiliary agitator for causing the stream of fluid having just entered the reactor to diverge and flow in various directions. Useful stirred-tank reactors are described, for example, in British Pat. No. 1,404,163. A typical example of such stirred-tank reactor has a helical-blade agitator mounted in a draft tube and also has two openings in the upper and lower parts thereof. A stream of fluid which comprises a mixture containing one or more monomers is introduced thereinto through the lower opening. In addition, the reactor is equipped with an auxiliary agitator for causing the stream of fluid having just entered the reactor to diverge and flow in various directions such as upward, downward and other directions. The auxiliary agitator can be, for example, of the turbine, fan-turbine, propeller or other suitable type. The auxiliary agitator may be either joined to the shaft of the helical-blade agitator or attached to a separate shaft which is driven by another source of power. The use of the auxiliary agitator is important in the manufacture of products including no giant rubber particles.

Referring now to the sole FIGURE, a feed material containing a rubber-like polymer is introduced through a fluid inlet 1, and the reaction mixture containing a product polymer is withdrawn from a fluid outlet 2. This reactor has both a helical-blade agitator 5 mounted in a draft tube 4 and an auxiliary agitator 3 which is effective in causing the stream of fluid having just entered the reactor to diverge and flow in various directions. The reference character "D" designates the diameter of helical-blade agitator 5.

The average number of circulations specified by the requisite B of the present invention is an index to the agitating efficiency of the agitators with which the reactor is equipped, and can be defined as follows: The reactor is filled with a solution of machine oil or polystyrene having a viscosity of approximately 1 poise. After agitation is started, a predetermined amount of a soluble tracer substance (such as a dye or a solvent) dissolved in a suitable solvent is injected instantaneously. Thereafter, small portions of the solution within the reactor were withdrawn at regular intervals of time and analyzed to determine the concentration of the tracer substance in each sample. If the time required for the relative difference between the calculated and found concentrations of the tracer substance to come within 5% is designated by $T_m$ (in hours), the average number of circulations is defined by the following equation:

Average Number of Circulations (per hour) $= 3/T_m$

For example, if $T_m$ is 0.2 hour, the average number of circulations is 15 per hour. The concentration of the tracer substance in samples can be determined by means of a colorimeter, gas chromatograph or the like. It is well known to those skilled in the art that a high-viscosity fluid, such as one resulting from the polymerization of styrene, can be mixed in a stirred tank. However, it is not easy to carry out the dispersion of a rubber-like polymer in a continuous manner while maintaining a stable state of operation. The present inventors have found that, in order to enable a prolonged operation while maintaining a stable state of operation (i.e., while keeping constant the degree of conversion of the polymerizable monomer to polymer, the average molecular weight of the polymer so formed, and the average particle diameter of the dispersed rubber-like polymer), it is necessary to establish an average number of circulation of not less than 20 per hour and preferably not less than 25 per hour by using a stirred-tank reactor having both a helical-blade agitator mounted in a draft tube and an auxiliary agitator.

In the process of the present invention, as specified by requisite C, the value of $N^2 \cdot D$ must satisfy $$20 > N^2 \cdot D > 0.15$$

where N is the rotational speed (in rps) of the helical-blade agitator and D is the diameter (in meters) of the helical-blade agitator. If the value of $N^2 \cdot D$ is equal to or less than 0.15 m/sec$^2$, giant particles are formed despite the fact that the average number of circulations is not less than 20 per hour. Moreover, a decrease in available reaction space and a reduction in heat transfer coefficient result from the adhesion of polymer during a prolonged operation, preventing the maintenance of a stable state of operation. The average diameter of the dispersed particles can be reduced by increasing the value of $N^2 \cdot D$. However, if the value of $N^2 \cdot D$ is equal to or greater than 20 m/sec$^2$, the average particle diameter is no longer changed and a significant waste of agitating power is produced.

In the process of the present invention, as specified by requisite D, the values of $X_1$ and $X_2$ must satisfy $$20 \geq X_1$$

and $$50 \geq X_2 \geq 2.4X_1 - 0.05X_1^2$$

where $X_1$ is the weight percentage of the rubber-like polymer and $X_2$ is the weight percentage of the polymerizable monomer converted to polymer, the weight percentages being based on the total amount of all components within the stirred-tank reactor used for the dispersing operation. The expression "all components within the stirred-tank reactor used for the dispersing operation" as used herein denotes all of the components which are present in the stirred-tank reactor during the polymerization reaction. More specifically, typical examples of such components include one or more monomers, the polymer formed from the monomers, a rubber-like polymer, and a solvent, if used. The weight percentage of the monomer converted to polymer in the stirred-tank reactor used for the dispersing operation can be controlled by such operating conditions as the reaction temperature of the stirred-tank reactor, the composition of the feed material introduced thereinto, the feed rate thereof, and/or the amount of polymerization initiator used. If $X_2 < 2.4X_1 - 0.05X_1^2$, it becomes impossible to transform the rubber-like polymer into dispersed particles or, even though it is possible, the formation of giant particles results. If $X_1 > 20$ or $X_2 > 50$, the agitating power required for the dispersing operation becomes excessively high and the manufacture of products having small particle diameters becomes difficult. As described above, the value of $X_2$ can be freely controlled by varying the conditions of the dispersing operation. However, the preferred range of $X_2$ is usually from 10 to 40% by weight, depending on the concentration of the rubber-like polymer.

It is well known that the average diameter of the rubber particles present in a rubber modified styrene resin depends on such factors as the type of rubber used, the degree of conversion of the monomer to polymer during the dispersing operation, the amount of chain transfer agent used, the intensity of agitation, and the like. In the process of the present invention, however, the type of rubber and the amount of chain transfer agent, such as mercaptans, alkylbenzenes and the like, can be chosen arbitrarily. Moreover, the degree of conversion of the monomer to polymer can be chosen in such a range as to satisfy the requisite D of the present invention. Furthermore, the rotational speed of the helical-blade agitator and hence the intensity of agitation can be altered, so long as the value of $N^2 \cdot D$ is kept within the range of 0.15 to 20 and preferably 0.3 to 10. Accordingly, the conditions under which products have a desired average particle diameter are produced can vary over a wide range. Thus, various grades of rubber modified styrene resins differing in the type of rubber, average particle diameter and/or rubber content can be produced selectively.

In the process of the present invention, the rubber-like polymer is used in the form of a solution in a styrene monomer, solvent or the like. Although the weight percentage ($X_1$) of the rubber-like polymer present in the stirred-tank reactor used for the dispersing operation need only satisfy the aforesaid requisite D, the preferred range of $X_1$ is usually from 2 to 15% by weight based on the total amount of all components within the stirred-tank reactor. Although it is not essential for the purpose of accomplishing the objects of the present invention, one or more monomers may previously (i.e., prior to the dispersing operation) be polymerized in the presence or absence of a rubber-like polymer, for example, in cases where the heat removing capacity of a single stirred-tank reactor is insufficient to achieve a desired polymerization rate, a special type of copolymerization needs to be carried out, or it is desired to utilize the existing equipment. Subsequently, the resulting reaction mixture is introduced into a stirred-tank reactor, where the dispersing operation is carried out according to the process of the present invention. It is to be understood that, if the preliminary polymerization is carried out in the absence of rubber-like polymer, a solution containing a rubber-like polymer is introduced into the aforesaid stirred-tank reactor together with the reaction mixture.

The term "rubber-like polymer" as used herein denotes any substance that is in a rubber-like state at room temperature. Specific examples of such rubber-like polymers include polybutadiene, styrene-butadiene copolymers, styrene-butadiene block copolymers, ethylene-propylene copolymers, ethylene-propylene-unconjugated diene terpolymers and the like.

The styrene monomer which is used in the process of the present invention can be at least one compound selected from styrene and derivatives thereof. Specific examples of such styrene monomers include styrene; alkylstyrenes such as methylstyrenes, ethylstyrenes, isopropylstyrenes, etc.; vinyl-substituted or nuclear-substituted halostyrenes such as chlorostyrenes, bromostyrenes, etc.; haloalkylstyrenes; and the like. In the process of the present invention, one or more monomers copolymerizable with the styrene monomer may be used in combination therewith. Specific examples of such copolymerizable monomers include acrylonitrile, methacrylonitrile, vinylidene cyanide, acrylic acid and methacrylic acid, as well as alkyl esters and other derivatives thereof.

If desired, a solvent may be used in the process of the present invention. Specific examples of useful solvents include ethylbenzene, ethyltoluene, toluene, xylene, ethylxylene, diethylbenzene and the like. Although no particular limitation is placed on the amount of solvent fed to the reactor, it is desirable to use a solvent in an amount not greater than 50% by weight based on the amount of monomer fed to the reactor. The reason for this is that an excessive amount of solvent causes a significant decrease in available reaction space and requires a large input of energy for its recovery.

In the process of the present invention, polymerization of the monomer is initiated by the application of heat or with the aid of a polymerization initiator. The polymerization initiator may be any substance that has a polymerization initiating effect on styrene monomers. The reaction temperature can be one commonly used for the polymerization of styrene monomers in the presence or absence of a polymerization initiator. Usually, the reaction temperature used in the dispersing step ranges from 60° to 180° C.

In the process of the present invention, the amount of fluid fed per unit time to the stirred-tank reactor used for the dispersing operation is usually of the order of 0.1 to 2 times the internal volume of the stirred-tank reactor. If preliminary polymerization is carried out prior to the dispersing operation, the amount of fluid fed per unit time may be increased, for example, to the order of 2 to 5 times the internal volume of the stirred-tank reactor.

After the dispersing operation has been carried out according to the process of the present invention, the reaction mixture may be subjected to further polymerization. Such polymerization can be carried out in one or more stirred-tank reactors or tubular reactors. Preferably, the equipment used for this purpose comprises two or three tubular reactors connected in series, two or three stirred-tank reactors connected in series, or one stirred-tank reactor connected in series with two tubular reactors. In such cases, the degree of conversion of the monomer to polymer at the end of the polymerizing operation rises to the order of 50 to 100% based on the total amount of monomer fed to all of the reactors. After completion of the polymerizing operation, the reaction mixture is usually devolatilized to obtain a product resin. During the polymerization subsequent to the dispersing operation, a fresh monomer, solvent, polymerization initiator and other additives (such as a molecular weight modifier and the like) may be added to the reaction mixture.

The rubber modified styrene resins produced by the process of the present invention may be either used alone or blended with other styrene resins to adapt them to intended purposes. Common additives for use in styrene resins, such as heat stabilizers, light stabilizers, antioxidants, flame retardants, plasticizers, colorants, lubricants, antistatic agents and the like, may be added to the product resin either by introducing them into the reactor or by incorporating them directly into the product resin.

According to the process of the present invention, various grades of rubber modified styrene resins differing in average particle diameter, rubber content and/or the type of rubber can be selectively produced in a single production system with a combination of wide freedom of operation and high efficiency. Moreover, the resulting products are substantially free of giant particles. Furthermore, the adhesion of rubber-like matter to the inner walls of the reactor can be prevented perfectly, and a feed material having a high rubber content can be used with successful dispersing operation. Thus, the process of the present invention has great industrial utility in that it can meet the demands for high-performance products responding to the extending range of use of rubber modified styrene resins and for cost reduction by the adoption of more efficient production processes.

The present invention is further illustrated by the following examples.

EXAMPLE 1

Polymerization was carried out by using one stirred-tank reactor and two tubular reactors. The stirred-tank reactor had an internal volume of 31.5 liters and was equipped with a helical-blade agitator mounted in a draft tube. The helical-blade agitator had a diameter of 0.18 meter and a length of 0.36 meter, and the pitch of the helix was 0.06 meter. To the end of the helical-blade agitator was joined an auxiliary agitator of a turbine type having a blade length of 0.05 meter and a blade width of 0.02 meter. The helical-blade agitator was mounted in the draft tube in such a way that the clearance between the outer edge of the helical-blade agitator and the inner surface of the draft tube was 0.003 meter. A feed material was introduced into the stirred-tank reactor through a fluid inlet located in proximity to the auxiliary agitator, and the reaction mixture was withdrawn from a fluid outlet opposed to the fluid inlet. The reaction mixture withdrawn from the stirred-tank reactor was introduced into two tubular reactors connected in series, where the polymerization was carried on. After leaving the tubular reactors, the reaction mixture was introduced into a devolatilizing tank, where it was devolatilized at a temperature of 230° C. in a vacuum of 30 mmHg to yield a product resin. More specifically, 7 parts by weight of polybutadiene rubber (which was purchased from Asahi Kasei Co. under the trade name of "Diene 55" and used in all of the examples given herein) was dissolved in 93 parts by weight of styrene. The resulting feed material was introduced into the stirred-tank reactor at a rate of 16 liters per hour. The reaction temperature of the stirred-tank reactor was adjusted to 127° C. The rotational speed of the agitators was 2.5 rps and, therefore, the value of $N^2 \cdot D$ was 1.1. Under these conditions of agitation, the average number of circulations was found to be 60 per hour.

After a steady state was established, a sample of the reaction mixture was taken to determine the concentration of the polystyrene so formed.

The average particle diameter of the rubber-like polymer present in the product resin was measured with a Coulter counter. Moreover, a portion of the product resin was extruded to form a sheet of 0.1 mm thickness, which was used to count the number of fisheyes having an area of 0.2 mm$^2$ or greater. After 24 hours' operation in a steady state, the stirred-tank reactor was purged with ethylbenzene and then emptied. Subsequent visual observation revealed the absence of rubber-like matter adhering to the inner walls of the stirred-tank reactor. The results of these analysis and observation are shown in Table 1. The same analytical and observational procedures were employed in the succeeding examples.

Furthermore, a molded piece was made of the product resin obtained in this example. When measured according to the method described in ASTM-D-256, the Izod impact strength of this molded piece was found to be 13 kg.cm/cm, indicating that it had a high level of impact resistance.

EXAMPLES 2 and 3

The procedure of Example 1 was repeated except that the rotational speed of the agitators was varied. The results thus obtained are shown in Table 1.

EXAMPLE 4

The procedure of Example 1 was repeated except that the feed material was composed of 14% by weight of polybutadiene and 86% by weight of styrene, the reaction temperature of the stirred-tank reactor was adjusted to 136° C., and the rotational speed of the agitators was increased to 7.8 rps. The results thus obtained are shown in Table 1.

EXAMPLE 5

Polymerization was carried out by using four stirred-tank reactors connected in series. The first-stage stirred-tank reactor had an internal volume of 1,300 liters and the second-stage, third-stage and fourth-stage ones had an internal volume of 1,350 liters. As for the first-stage stirred-tank reactor, the agitators and the draft tube were similar to those described in Example 1, but different therefrom in size. More specifically, the helical-blade agitator had a diameter of 0.86 meter and a length of 1.72 meters, and the pitch of the helix was 0.14 meter. The auxiliary agitator was of a turbine type having a blade length of 0.2 meter and a blade width of 0.05 meter. The fluid inlet and outlet were similar to those described in Example 1. The feed material was composed of 8% by weight of polybutadiene, 87% by weight of styrene, and 5% by weight of ethylbenzene and introduced into the first-stage stirred-tank reactor at a rate of 721 liters per hour. The rotational speed of the agitators was 1.1 rps. The results thus obtained are shown in Table 1.

COMPARATIVE EXAMPLE 1

The procedure of Example 3 was repeated except that the stirred-tank reactor had an internal volume of 62 liters and the feed rate was increased to 32 liters per hour. The results thus obtained are shown in Table 1.

COMPARATIVE EXAMPLE 2

The procedure of Example 1 was repeated except that the stirred-tank reactor had an internal volume of 22 liters, the feed rate was decreased to 11 liters per hour, and the rotational speed of the agitators was reduced to 0.75 rps. The rate of polymerization achieved in the stirred-tank reactor became lower as time went on. Other results are shown in Table 1.

COMPARATIVE EXAMPLE 3

The procedure of Example 1 was repeated except that the auxiliary agitator joined to the end of the helical-blade agitator was omitted. The results thus obtained are shown in Table 1.

COMPARATIVE EXAMPLE 4

The procedure of Example 1 was repeated except that the feed rate was increased to 20 liters per hour and the reaction temperature of the stirred-tank reactor was adjusted to 123° C. Thus, the stirred-tank reactor failed to transform the rubber-like polymer into dispersed particles. Other results are shown in Table 1.

TABLE 1*

|  |  |  | Unit | Examples 1 | 2 | 3 | 4 | 5 | Comparative Examples 1 | 2 | 3 | 4 |
|---|---|---|---|---|---|---|---|---|---|---|---|---|
| Conditions of Dispersing Operation | Diameter (D) of helical-blade agitator | | m | 0.18 | 0.18 | 0.18 | 0.18 | 0.86 | 0.18 | 0.18 | 0.18 | 0.18 |
| | Internal volume of reactor | | l | 31.5 | 31.5 | 31.5 | 31.5 | 1300 | 62 | 22 | 31.5 | 31.5 |
| | Rotational speed (N) of agitators | | rps | 2.5 | 10 | 1.1 | 7.8 | 1.1 | 1.1 | 0.75 | 2.5 | 2.5 |
| | Reaction temperature | | °C. | 127 | 127 | 127 | 136 | 132 | 127 | 127 | 127 | 123 |
| | Feed rate | | l/hr | 16 | 16 | 16 | 16 | 721 | 32 | 11 | 16 | 20 |
| | Composition of feed Material | Styrene | wt. % | 93 | 93 | 93 | 86 | 87 | 93 | 93 | 93 | 93 |
| | | Ethylbenzene | wt. % | 0 | 0 | 0 | 0 | 5 | 0 | 0 | 0 | 0 |
| | | Polybutadiene | wt. % | 7 | 7 | 7 | 14 | 8 | 7 | 7 | 7 | 7 |
| | Presence of auxiliary agitator [Requisite A] | | | Yes | Yes | Yes | Yes | Yes | Yes | Yes | No | Yes |
| | Average number of circulations [Requisite B] | | hr$^{-1}$ | 60 | >100 | 24 | >100 | 70 | 11 | 26 | 40 | 50 |
| | $N^2 \cdot D$ [Requisite C] | | m/sec$^2$ | 1.1 | 18 | 0.2 | 11 | 1.0 | 0.2 | 0.1 | 1.1 | 1.1 |
| | Composition of contents of dispersing tank** [Requisite D] | Polystyrene ($X_2$) | wt. % | 19 | 18 | 20 | 29 | 20 | 20 | — | — | 11 |
| | | Polybutadiene ($X_1$) | wt. % | 7 | 7 | 7 | 14 | 8 | 7 | 7 | 7 | 7 |
| Results | Average particle diameter | | μ | 1.8 | 0.8 | 8.7 | 2.1 | 1.7 | — | — | — | — |
| | Number of fisheyes per 1000 cm$^2$ | | | 0 | 0 | 1 | 1 | 0 | 15 | 21 | 18 | — |
| | Adhesion of rubber-like matter*** | | | No | No | No | No | No | Yes | Yes | — | — |

*The dashes given in this table mean that no measurements were made or that measurements could not be made.
**The composition of the contents of the stirred-tank reactor used for the dispersing operation is expressed in terms of weight percentage based on the total amount of all components.
***In Example 5, the observation was made after 240 hours' operation.

What is claimed is:

1. A process for continuously producing rubber modified styrene resins from a rubber-like polymer and a styrene monomer according to solution or bulk polymerization techniques, which comprises (A) transforming the rubbery phase including said rubber-like polymer into dispersed particles in a stirred-tank reactor having both a helical-blade agitator mounted in a draft tube and an auxiliary agitator for causing the stream of fluid having just entered said reactor to diverge and flow in various directions;

(B) controlling the agitating efficiency of said agitators in such a way that the average number of circulations of the fluid within said reactor is not less than 20 per hour;

(C) operating said helical-blade agitator in such a way that the value of $N^2 \cdot D$ satisfies $$20 > N^2 \cdot D > 0.15$$

where N is the rotational speed, in rps, of said helical-blade agitator and D is the diameter, in meters, of said helical-blade agitator; and (D) determining the operating conditions in such a way that the values of $X_1$ and $X_2$ satisfy $$20 \geq X_1$$

and $$50 \geq X_2 \geq 2.4 X_1 - 0.05 X_1^2$$

where $X_1$ is the weight percentage of said rubber-like polymer and $X_2$ is the weight percentage of the polymerizable monomer converted to polymer, said weight percentages being based on the total amount of all components within said reactor.

2. The process of claim 1 wherein the average number of circulations of the fluid within said reactor is not less than 25 per hour.

3. The process of claim 1 wherein the value of $X_2$ is in the range of 10 to 40% by weight.

4. The process of claim 1 wherein the value of $X_1$ is in the range of 2 to 15% by weight.

5. The process of claim 1 wherein the value of $N^2 \cdot D$ is in the range of 0.3 to 10.

6. The process of claim 1 wherein the amount of fluid fed per unit time to said reactor equals 0.1 to 2 times the internal volume of said reactor.

7. The process of claim 1 wherein, subsequent to the transformation of the rubbery phase including said rubber-like polymer into dispersed particles in a stirred-tank reactor having both a helical-blade agitator mounted in a draft tube and an auxiliary agitator for causing the stream of fluid having just entered said stirred-tank reactor to diverge and flow in various directions, the polymerization is brought to completion in equipment comprising two or three tubular reactors connected in series.

8. The process of claim 1 wherein, subsequent to the transformation of the rubbery phase including said rubber-like polymer into dispersed particles in a stirred-tank reactor having both a helical-blade agitator mounted in a draft tube and an auxiliary agitator for causing the stream of fluid having just entered said stirred-tank reactor to diverge and flow in various directions, the polymerization is brought to completion in equipment comprising two or three conventional stirred-tank reactors connected in series.

9. The process of claim 1 wherein said rubber-like polymer is polybutadiene rubber and said styrene monomer is styrene.

* * * * *